(12) United States Patent
Lovett et al.

(10) Patent No.: US 11,144,961 B1
(45) Date of Patent: Oct. 12, 2021

(54) MESSENGER BOT AND GEOLOCATION BEACON BASED SYSTEM AND RELATED METHODS

(71) Applicant: INMAR CLEARING, INC., Winston-Salem, NC (US)

(72) Inventors: Lee Lovett, Springfield, PA (US); Nathanael Georgeson, Seattle, WA (US); O'Ryan McEntire, Seattle, WA (US); Samuel May, Kent, WA (US); Zackary Smith, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 301 days.

(21) Appl. No.: 16/156,553

(22) Filed: Oct. 10, 2018

(51) Int. Cl.
*G06Q 30/00* (2012.01)
*G06Q 30/02* (2012.01)
*G06Q 20/40* (2012.01)

(52) U.S. Cl.
CPC ......... *G06Q 30/0261* (2013.01); *G06Q 20/40* (2013.01); *G06Q 30/0225* (2013.01); *G06Q 30/0267* (2013.01); *G06Q 30/0269* (2013.01)

(58) Field of Classification Search
CPC .................. G06Q 30/0207–0277; G06Q 20/40
See application file for complete search history.

(56) References Cited

U.S. PATENT DOCUMENTS

| | | | |
|---|---|---|---|
| 2011/0029370 A1* | 2/2011 | Roeding | G06Q 30/0205 705/14.38 |
| 2013/0030931 A1 | 1/2013 | Moshfeghi | |
| 2013/0185137 A1 | 7/2013 | Shafi et al. | |
| 2013/0238455 A1* | 9/2013 | Laracey | G06Q 20/108 705/21 |
| 2014/0279014 A1 | 9/2014 | Roka et al. | |
| 2016/0313906 A1* | 10/2016 | Kilchenko | G06N 3/0436 |
| 2017/0169476 A1* | 6/2017 | Nomula | G06N 20/00 |
| 2018/0332167 A1* | 11/2018 | Lu | G06F 16/3322 |

* cited by examiner

*Primary Examiner* — Kambiz Abdi
*Assistant Examiner* — Christopher Stroud
(74) *Attorney, Agent, or Firm* — Allen, Dyer, Doppelt + Gilchrist, P.A.

(57) ABSTRACT

A system for processing a digital promotion may include user devices and a geolocation beacon at a redemption location. The system may also include a digital promotion server to detect presence of a given user device at the redemption location based upon communication with the geolocation beacon. The digital promotion server may also operate a messenger bot to collect information and communicate a digital promotion for a product to the given user device based upon the collected information and the detection of presence of the given user device at the redemption location, and obtain an amount due from the redemption location and associated with the given user device. The digital promotion server may also communicate to the redemption location authorization for payment of the amount due based upon the detection of presence of the given user device at the redemption location and based upon the collected information.

14 Claims, 4 Drawing Sheets

MESSENGER BOT AND GEOLOCATION BEACON BASED SYSTEM AND RELATED METHODS

TECHNICAL FIELD

The present invention relates to the field of electronics, and more particularly, to messenger bot based communications and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A system for processing a digital promotion may include a plurality of user devices and at least one geolocation beacon at a redemption location. The system also may include a digital promotion server comprising a processor and a memory cooperating therewith to detect presence of a given user device at the redemption location based upon communication with the at least one geolocation beacon. The processor may be configured to operate a messenger bot to collect information and communicate the digital promotion for a product to the given user device based upon the collected information and the detection of presence of the given user device at the redemption location, and obtain an amount due from the redemption location and associated with the given user device. The processor may also be configured to communicate to the redemption location authorization for payment of the amount due based upon the detection of presence of the given user device at the redemption location and based upon the collected information.

The authorization for payment of the amount due may include an authorization for payment of the amount due from the given user device, for example. The authorization for payment of the amount due may include an authorization for cardless payment of the amount due.

The at least one of the user devices may have a payment account associated therewith. The processor may be configured to communicate the authorization for payment of the amount due based upon the payment account, for example.

The processor may be configured to validate redemption of the digital promotion at the redemption location. The digital promotion may be for an entire purchase price of the product and redeemable against the amount due during a purchase transaction for the product at the redemption location, for example. The information collected from the messenger bot may include at least one of a user name, social media profile, user date of birth, user geographic location, and desired product from a brand thereof.

A method aspect is directed to a method of processing a digital promotion and may include using a processor and a memory cooperating therewith to detect presence of a given user device from among a plurality thereof at a redemption location based upon communication with at least one geolocation beacon at the redemption location. The method may also include using the processor to operate a messenger bot to collect information and communicate the digital promotion for a product to the given user device based upon the collected information and the detection of presence of the given user device at the redemption location, and obtain an amount due from the redemption location and associated with the given user device. The method may further include using the processor to communicate to the redemption location authorization for payment of the amount due based upon the detection of presence of the given user device at the redemption location and based upon the collected information.

A computer readable medium aspect is directed to a non-transitory computer readable medium for processing a digital promotion. The non-transitory computer readable medium includes computer executable instructions that when executed by a processor cause the processor to perform operations. The operations may include detecting presence of a given user device from among a plurality thereof at a redemption location based upon communication with at least one geolocation beacon at the redemption location, and operating a messenger bot to collect information and communicate a digital promotion for a product to the given user device based upon the collected information and the detection of presence of the given user device at the redemption location. The operations may also include obtaining an amount due from the redemption location and associated with the given user device, and communicating to the redemption location authorization for payment of the amount due based upon the detection of presence of the given user device at the redemption location and based upon the collected information.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
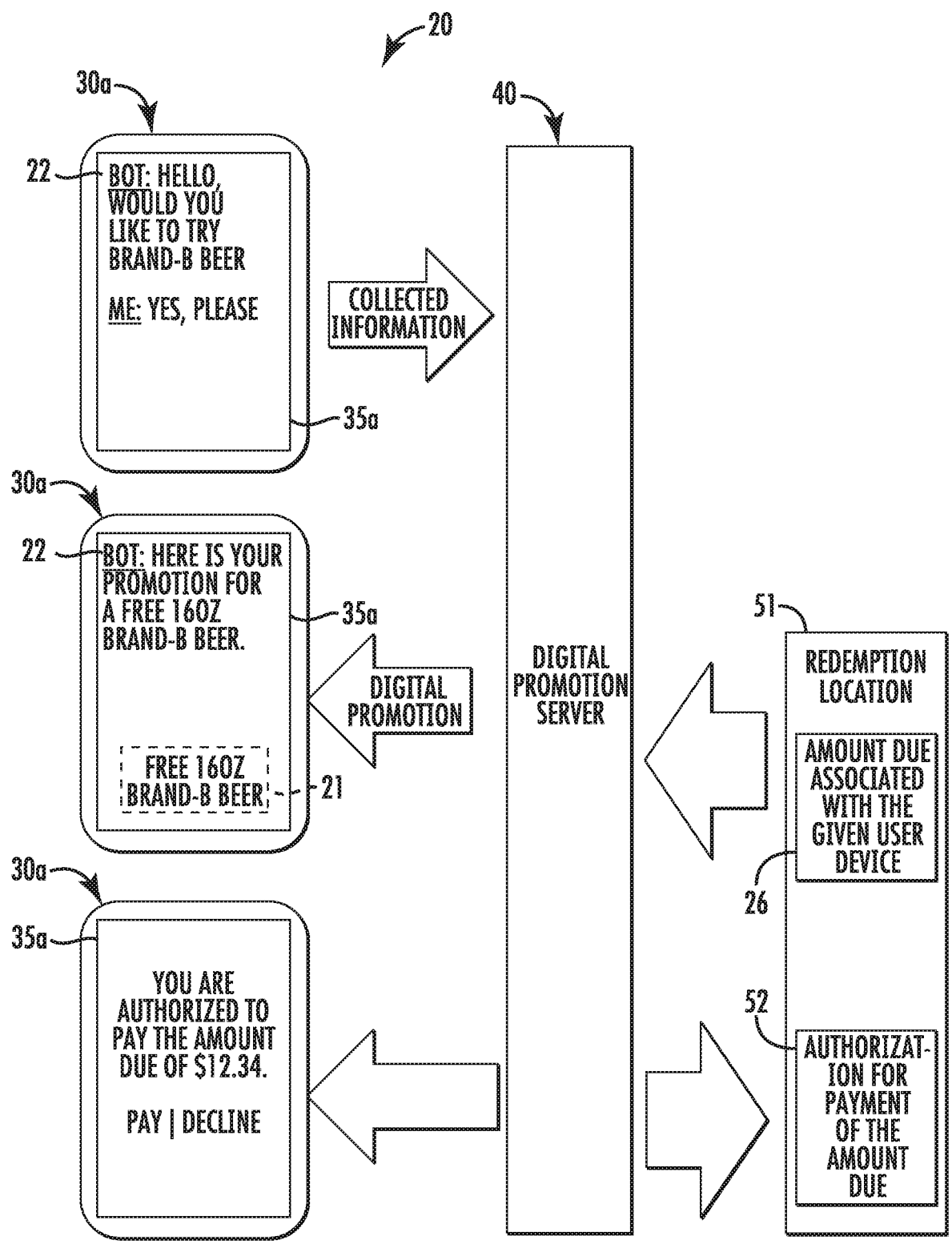
FIG. 1 is a schematic diagram of a system for processing a digital promotion in accordance with an embodiment.
Figure 2:
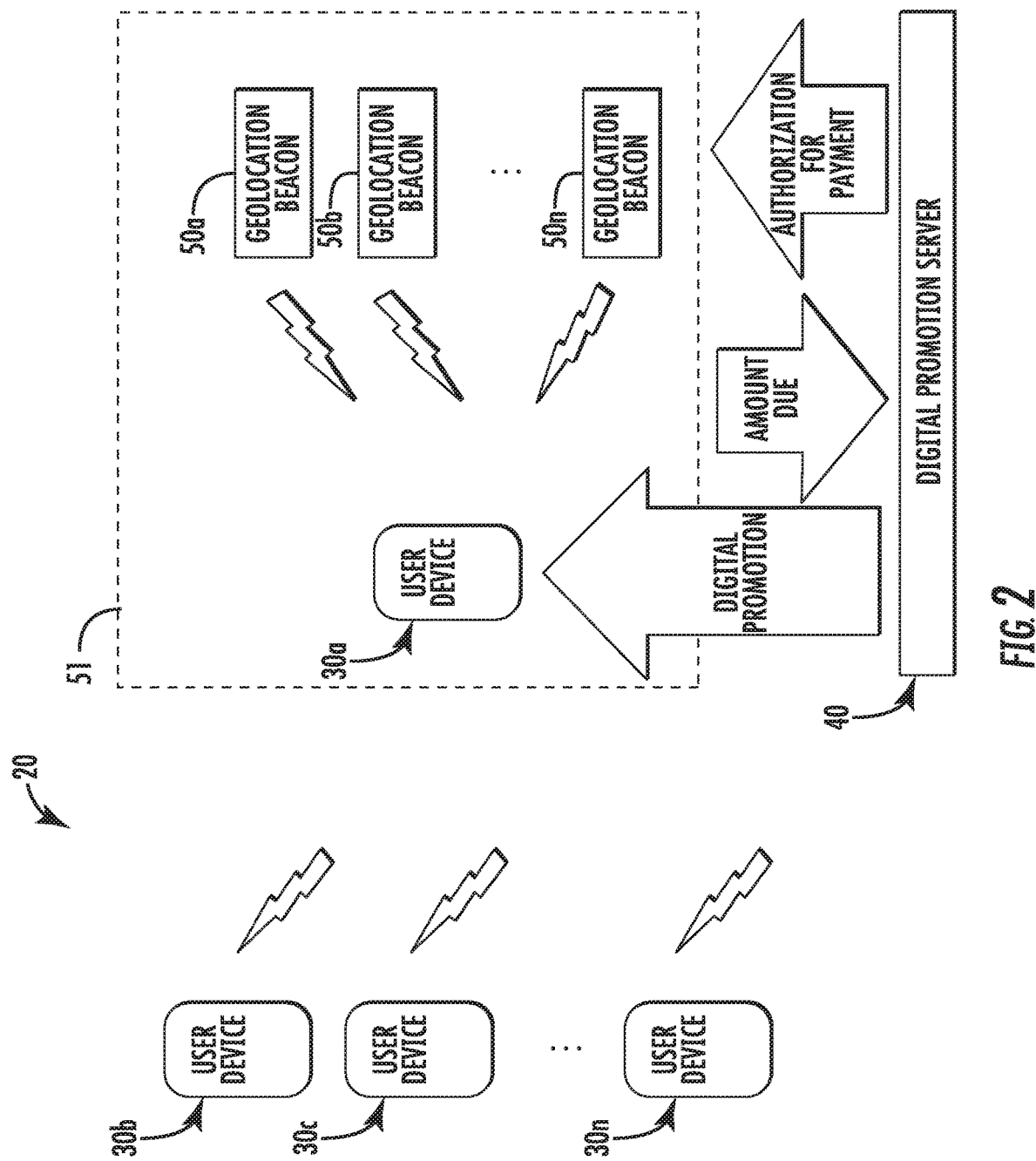
FIG. 2 is another schematic diagram of a system for processing a digital promotion in accordance with an embodiment.
Figure 3:
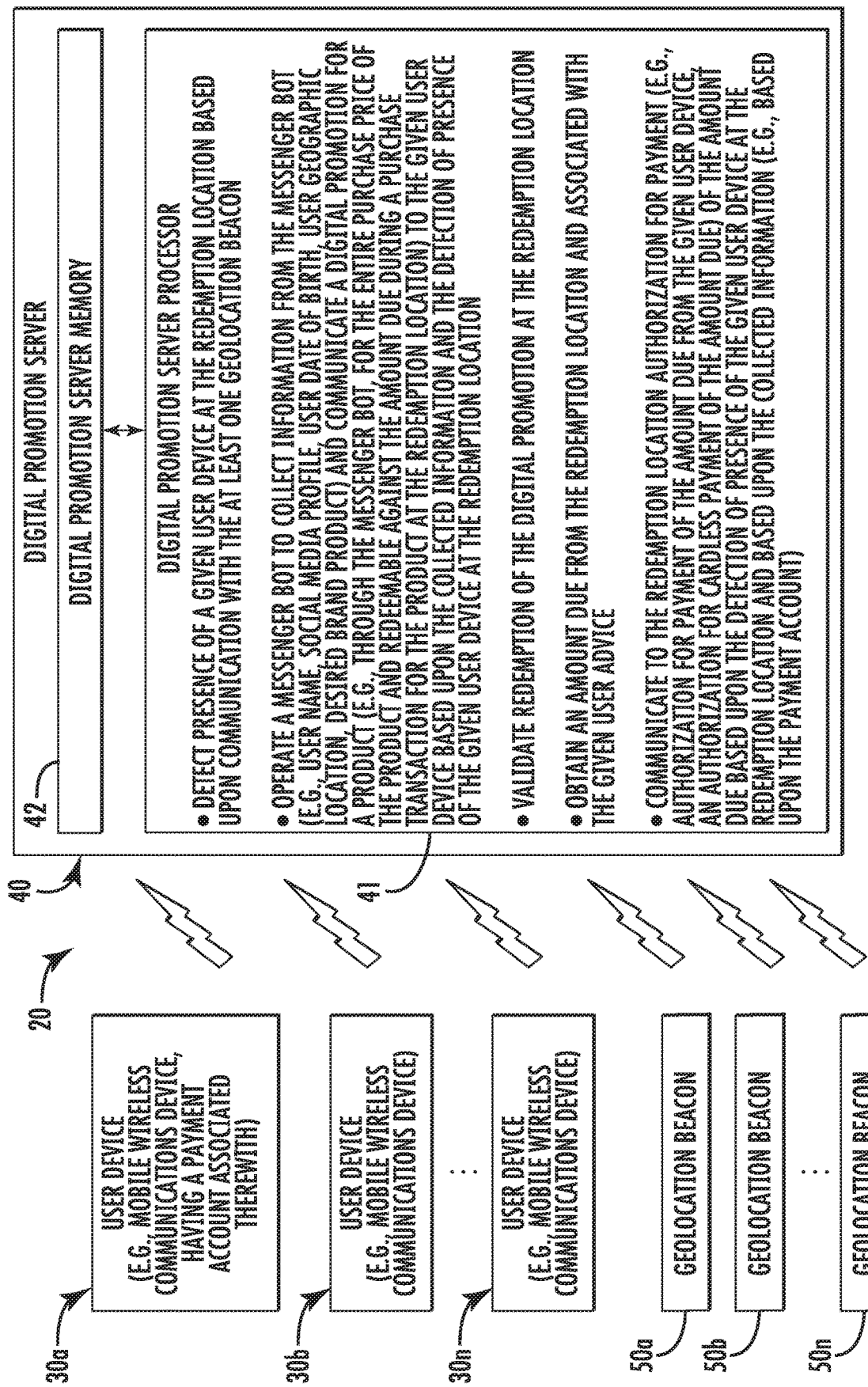
FIG. 3 is a schematic block diagram of a system for processing a digital promotion in accordance with an embodiment.

Referring initially to FIGS. 1-3, a system 20 for processing a digital promotion includes user devices 30a-30n. The user devices 30a-30n are each illustratively in the form of a mobile wireless communications device, such as, for example, a mobile or smart phone. Each user device 30a-30n may be another type of device, for example, a personal computer either wired or wireless, a tablet computer, and/or a wearable device. Of course each user device 30a-30n may be another type of device as will be appreciated by those skilled in the art.

The system 20 also includes geolocation beacons 50a-50n within or at a redemption location 51, for example, a restaurant, bar, and/or grocery store. As will be appreciated by those skilled in the art, the geolocation beacons 50a-50n are typically used for indoor location determining and provide relatively accurate location or position information within a relatively small range. Because of their relatively small range, the geolocation beacons 50a-50n may, in some instances, be more accurate than global positioning system (GPS) based location determining devices. The geolocation beacons 50a-50n include wireless communications circuitry, for example, WiFi, Bluetooth, and/or other types of circuitry for determining location. Other location determining techniques may be used by the geolocation beacons 50a-50n, for example, magnetic based determination, triangulation, etc., as will be appreciated by those skilled in the art. While several geolocation beacons 50a-50n are described, a single geolocation beacon may be within the redemption location 51.

The system 20 further includes a digital promotion server 40 communicatively coupled to user devices 30a-30n. The digital promotion server 40 includes a digital promotion processor 41 and a digital promotion memory 42 coupled to the digital promotion processor. The digital promotion server 40 may be a remote computer, for example. It should be understood that while operations of the digital promotion server 40 are described herein, those operations are based upon cooperation of the memory 41 and the processor 42. The digital promotions server 40 may communicate with the user device 30a-30n by way of one or more communications networks, for example, the Internet.

Figure 4:
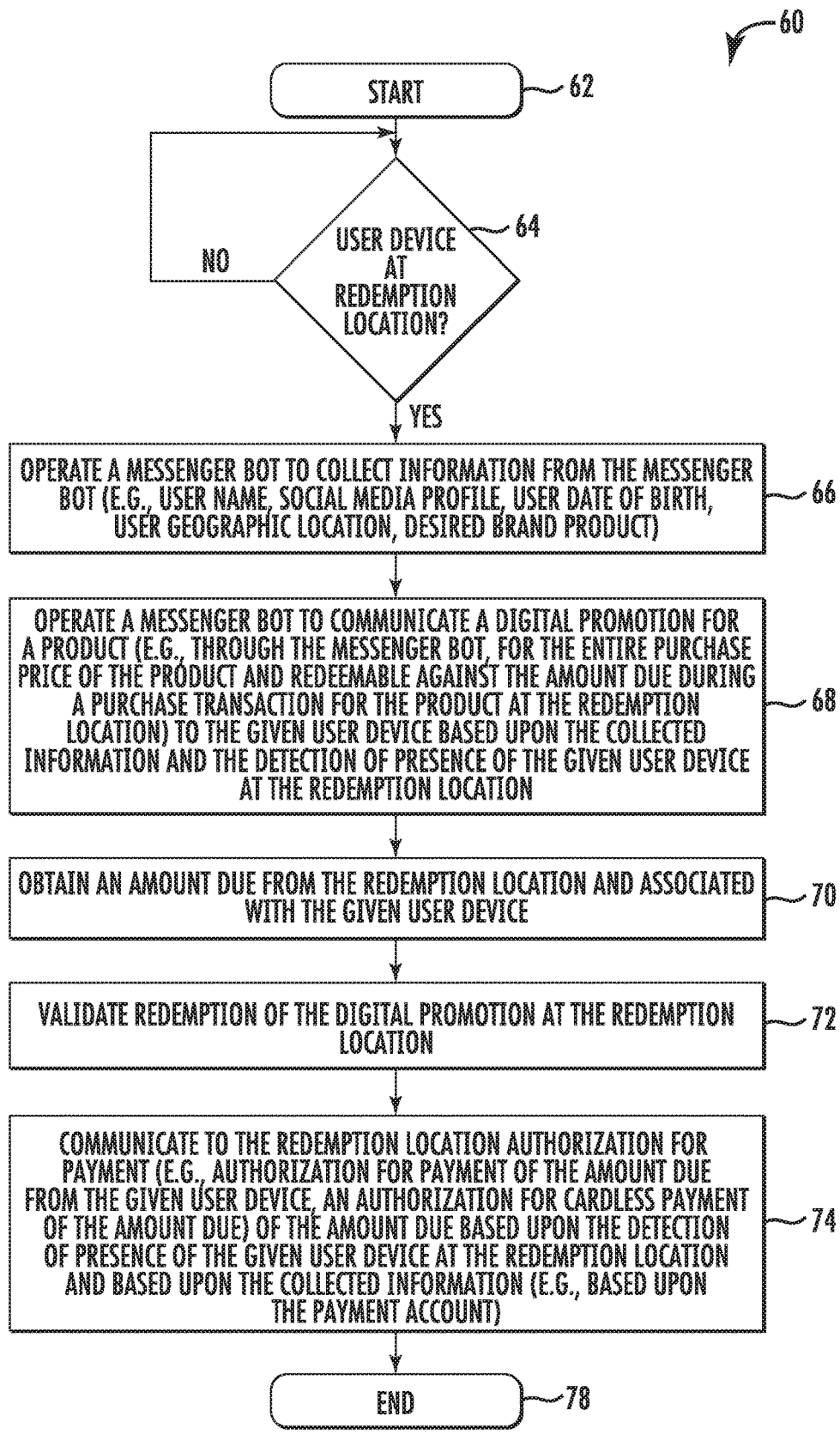
FIG. 4 is a flow chart illustrating operation of a digital promotion server of a system for processing a digital promotion in accordance with an embodiment.

Referring now additionally to the flowchart 60 in FIG. 4, details of operation of the system 20 will now be described with reference to the digital promotion server 40. Beginning at Block 62, the digital promotion server 40 detects a presence of a given user device 30a at the redemption location 51 based upon communication with the geolocation beacons 50a-50n (Block 64). More particularly, the digital promotion server 40 determines whether the given user device 30a is within or at the redemption location 51, for example, at a particular restaurant, bar, and/or grocery store. The digital promotion server 40 may poll for detected presence when the given user device 30a is not at the redemption location 51.

At Block 66, the digital promotion server 40 operates a messenger bot 22, for example, on the given user device 30a to collect information and, at Block 68, communicates a digital promotion 21 for a product to the given user device 30a based upon the collected information and the detection of presence of the given user device at the redemption location 51. In other words, for example, when requested or through communication with the messenger bot 22, the digital promotion 21 server 40 may communicate a digital promotion that is redeemable at the redemption location 51. The digital promotion 21 may be redeemable at the redemption location 51 and/or one or more other redemption locations. Of course, the digital promotion 21 may be redeemable at other types of locations. It should be understood that the messenger bot 22 may be operated and/or the digital promotion 21 communicated regardless of whether the given user device 30a is at the redemption location 51.

The messenger bot 22 may be implemented in the form of a two-way dialog box that permits the given user to communicate by way of typing (i.e., written communication). In some embodiments, the messenger bot 22 may operate through voice commands or spoken words. The underlying program behind the messenger bot 22 may be a different program, application, and/or website than that serving the first digital promotion 21. For example, the digital promotion 21 may be inline in a news feed on Facebook while the messenger bot 22 may be executed through the Facebook Messenger program or application. The application or program associated with the messenger bot 22 may be executed or opened, for example, based upon user selection of the first digital promotion 21. The information collected through the messenger bot 22 may include at least one of a user name, social media username, email address, social media profile, date of birth, user geographic location (e.g., for confirmation of geographic location with the geolocation beacons 50a-50n), and/or desired product from the brand. Of course, the digital promotion server 40 may collect other and/or additional types of information.

The product associated with the digital promotion 21 may be a brand and/or class or type of product, for example, and thus the messenger bot 22 may be associated with a given brand. The digital promotion 21 may be displayed on a display 35a of a user device 30a, for example, inline in a social media feed. An exemplary messenger bot 22 conversation may ask whether the user would like to try a "Brand-B Beer," and if the user, via the user device 30a responds yes, then providing the corresponding digital promotion 21. An exemplary digital promotion 21 may be along the lines of "Enjoy a Brand-B Beer On Brand-B," or in the context of a messenger bot 22 conversation, "Here is your promotion for a free 16 oz Brand-B Beer." Of course, the digital promotion 21 may be included on a website, in an email, and/or other electronic form.

The digital promotion server 40 communicates the digital promotion 21 for the given product (e.g., through the messenger bot 22) to the given user device 30a-30n, for example, based upon the collected information (Block 68). The digital promotion 21 may be redeemable for an entire purchase price of the product and redeemable against an amount due for the product and/or other products services during a purchase transaction at the redemption location 51.

In some embodiments, the digital promotion server 40 and the given user device 30a may cooperate to save the digital promotion 21 in a digital wallet associated with the user, for example, at either or both of a mobile device memory and the digital promotions memory 42. The digital promotion 21 may be redeemed, for example, at a point-of-sale (POS) terminal, at the selected redemption location. For example, in an exemplary implementation, the given user may have an open tab or working guest check at the redemption location 51. Brand-B Beer may be on the guest check and the digital promotion 21 may be applied toward the guest check for the purchase price of the Brand-B Beer. Other items may be included on the guest check such that at the conclusion or closing of the guest check, there is an amount due 26 associated with the given user device 30a.

At Block 70, the digital promotion server 40 obtains the amount due 26 from the redemption location 51 and associated with the given user device 30a. With respect to the Brand-B Beer example, along with the Brand-B Beer, the given user may have purchased a Brand-C Beer, a hotdog, and a double cheeseburger, all of which may be included on the guest check such that the amount due 26 is equal to the sum of those items (minus the digital promotion 21 for the Brand-B Beer) plus any applicable taxes, fees, and/or service charges. The digital promotion server 40 may obtain the amount due 26 based upon communication with a POS terminal at the redemption location 51 and based upon an identifier associated with the given user device 30a and/or the associated user.

The digital promotion server 40 may validate redemption of the digital promotion 21 at the redemption location 51 (Block 72). More particularly, the digital promotion server 40 may cooperate with a POS terminal at the redemption location 51, for example, by way of a validation code, user and/or device identity validation, etc. so the digital promotion 21 can be redeemed. The digital promotion 21 may be redeemable only at the redemption location 51. In some embodiments, the digital promotion server 40 may validate redemption of the first digital promotion 21 at other and/or additional redemption locations, for example, based upon selection from the given user.

The digital promotion server 40, at Block 74, communicates to the redemption location 51 authorization for payment 52 of the amount due 26 based upon the detection of presence of the given user device 30a at the redemption location and based upon the collected information. More particularly, when the digital promotion server 40 determines that the given user device 30a is at the redemption location (Block 64), the digital promotion server may communicate, for example, wirelessly, the authorization for payment 52 of the amount due 26 from the given user device 30a and as a cardless payment. By cardless payment, those skilled in the art will appreciate the user associated with the given user device 30a does not have to physically present a payment card, for example, for swiping or insertion at a POS terminal, at the redemption location 51. The operations end at Block 78.

In some embodiments, the digital promotion server 40 may communicate the authorization for payment 52 based upon a payment account associated with the given user device 30a. More particularly, the digital promotion server 40 may store or obtain (e.g., from the given user device 30a) payment information (e.g., account number, etc.) and communicate the payment account information to the POS terminal to complete the transaction. In other words, the digital promotion server 40 may communicate the authorization for payment 52 for users that are considered known or that have a payment account information associated therewith. In other embodiments, the given user device 30a may communicate with the POS terminal at the redemption location 51 and the digital promotion server 40 may facilitate the communication or communicate with either or both of the POS terminal and given user device 30a as a basis for communicating the authorization for payment 52. Confirmation and/or an indication of whether authorization for payment of the amount due 26 (e.g., cardless payment) may be displayed on the display 35a of the given user device 30a.

Accordingly, the system 20, and more particularly, the operations of the digital promotion server 40, may advantageously provide increased efficiency payment processing while providing a digital promotion 21. Those skilled in the art will appreciate that the system 20 provides or processes (e.g., obtains, collects, communicates) information unconventionally, based upon the geolocation beacons and with respect to digital promotions and payment authorizations.

A method aspect is directed to a method of processing a digital promotion 21 and may include using a processor 41 and a memory 42 cooperating therewith to detect presence of a given user device 30a-30n from among a plurality thereof at a redemption location 51 based upon communication with at least one geolocation beacon 50a-50n within the redemption location. The method may also include using the processor 41 to operate a messenger bot 22 to collect information and communicate the digital promotion 21 for a product to the given user device 30a-30n based upon the collected information and the detection of presence of the given user device at the redemption location 51, and obtain an amount due 26 from the redemption location and associated with the given user device. The method may further include using the processor 41 to communicate to the redemption location 51 authorization for payment 52 of the amount due 26 based upon the detection of presence of the given user device 30a-30n at the redemption location and based upon the collected information.

A computer readable medium aspect is directed to a non-transitory computer readable medium for processing a digital promotion 21. The non-transitory computer readable medium includes computer executable instructions that when executed by a processor 41 cause the processor to perform operations. The operations may include detecting presence of a given user device 30a-30n from among a plurality thereof at a redemption location 51 based upon communication with at least one geolocation beacon 50a-50n within the redemption location, and operating a messenger bot 22 to collect information and communicate a digital promotion 21 for a product to the given user device based upon the collected information and the detection of presence of the given user device at the redemption location. The operations may also include obtaining an amount due 26 from the redemption location 21 and associated with the given user device 30a-30n, and communicating to the redemption location authorization for payment 52 of the amount due 26 based upon the detection of presence of the given user device at the redemption location and based upon the collected information.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital coupon comprising:
a point-of-sale (POS) terminal at a physical redemption location serving a given food or beverage product;
a plurality of user devices;
at least one geolocation beacon at the physical redemption location; and
a digital promotion server comprising a processor and a memory cooperating therewith to
poll for detected presence of a given user device at the physical redemption location based upon obtaining a given user device identifier associated with the given user device and communication with the at least one geolocation beacon, the given user device being associated with a given user, operate a messenger bot to collect information and communicate the digital coupon through the messenger bot for the given food or beverage product to the given user device based upon the collected information and the detection of presence of the given user device at the physical redemption location, the collected information comprising a user geographic location of the given user device, the digital coupon having a redemption value and being redeemable toward a purchase of the given food or beverage product, and the messenger bot being implemented in a form of a two-way dialog between the messenger bot and the given user, cooperate with the POS terminal to determine closing of an open guest check associated with a food and beverage tab for the given user based upon the given user device identifier, cooperate with the POS terminal to obtain, from the physical redemption location, an amount due associated with the closed guest check, validate redemption of the digital coupon at the physical redemption location based upon the given user device identifier and confirmation of the detected presence of the given user device at the physical redemption location based upon the collected user geographic location of the given user device via the messenger bot, cooperate with the POS terminal to apply the redeemable value of the digital coupon based upon the validation to obtain an amount due, and communicate to the physical redemption location authorization for payment of the amount due as a cardless payment based upon the confirmation of the detection of presence of the given user device at the physical redemption location and based upon the collected information.

2. The system of claim 1 wherein the authorization for payment of the amount due comprises an authorization for payment of the amount due from the given user device.

3. The system of claim 1 wherein at least one of the user devices has a payment account associated therewith; and wherein the processor is configured to communicate the authorization for payment of the amount due based upon the payment account.

4. The system of claim 1 wherein the redeemable value is for an entire purchase price of the food or beverage product.

5. The system of claim 1 wherein the information collected from the messenger bot comprises at least one of a user name, social media profile, user date of birth, and desired product from a brand thereof.

6. A digital promotion server comprising:
a processor and a memory cooperating therewith to
poll for detected presence of a given user device from among a plurality thereof at a physical redemption location serving a given food or beverage product based upon obtaining a given user device identifier associated with the given user device and communication with at least one geolocation beacon at the physical redemption location, the given user device being associated with a given user, operate a messenger bot to collect information and communicate a digital coupon through the messenger bot for a given food or beverage product to the given user device based upon the collected information and the detection of presence of the given user device at the physical redemption location, the collected information comprising a user geographic location of the given user device, the digital coupon having a redemption value and being redeemable toward a purchase of the given food or beverage product, and the messenger bot being implemented in a form of a two-way dialog between the messenger bot and the given user, cooperate with a point-of-sale (POS) terminal at the physical redemption location serving the given food or beverage product to determine closing of an open guest check associated with a food and beverage tab for the given user based upon the given user device identifier, cooperate with the POS terminal to obtain, from the physical redemption location, an amount due associated with the closed guest check, validate redemption of the digital coupon at the physical redemption location based upon the given user device identifier and confirmation of the detected presence of the given user device at the physical redemption location based upon the collected user geographic location of the given user device via the messenger bot, cooperate with the terminal to apply the redeemable value of the digital coupon based upon the validation to obtain an amount due, and communicate to the physical redemption location authorization for payment of the amount due as a cardless payment based upon the confirmation of the detection of presence of the given user device at the physical redemption location and based upon the collected information.

7. The digital promotion server of claim 6 wherein the authorization for payment of the amount due comprises an authorization for payment of the amount due from the given user device.

8. The digital promotion server of claim 6 wherein at least one of the user devices has a payment account associated therewith; and wherein the processor is configured to communicate the authorization for payment of the amount due based upon the payment account.

9. A method of processing a digital coupon comprising:
using a processor and a memory cooperating therewith to
poll for detected presence of a given user device from among a plurality thereof at a physical redemption location serving a given food or beverage product based upon obtaining a given user device identifier associated with the given user device and communication with at least one geolocation beacon at the physical redemption location, the given user device being associated with a given user, operate a messenger bot to collect information and communicate the digital coupon through the messenger bot for a given food or beverage product to the given user device based upon the collected information and the detection of presence of the given user device at the physical redemption location, the collected information comprising a user geographic location of the given user device, the digital coupon having a redemption value and being redeemable toward a purchase of the given food or beverage product, and the messenger bot being implemented in a form of a two-way dialog between the messenger bot and the given user, cooperate with a point-of-sale (POS) terminal at the physical redemption location serving the given food or beverage product to determine closing of an open guest check associated with a food and beverage tab for the given user based upon the given user device identifier, cooperate with the POS terminal to obtain, from the physical redemption location, an amount due associated with the closed guest check, validate redemption of the digital coupon at the physical redemption location based upon the given user device identifier and confirmation of the detected presence of the given user device at the physical redemption location based upon the collected user geographic location of the given user device via the messenger bot, cooperate with the POS terminal to apply the redeemable value of the digital coupon based upon the validation to obtain an amount due, and communicate to the physical redemption location authorization for payment of the amount due as a cardless payment based upon the confirmation of the detection of presence of the given user device at the physical redemption location and based upon the collected information.

10. The method of claim 9 wherein the authorization for payment of the amount due comprises an authorization for payment of the amount due from the given user device.

11. The method of claim 9 wherein at least one of the user devices has a payment account associated therewith; and wherein using the processor comprises using the processor to communicate the authorization for payment of the amount due based upon the payment account.

12. A non-transitory computer readable medium for processing a digital coupon comprising computer executable instructions that when executed by a processor cause the processor to perform operations, the operations comprising:

polling to detect presence of a given user device from among a plurality thereof at a physical redemption location serving a given food or beverage product based upon obtaining a given user device identifier associated with the given user device and communication with at least one geolocation beacon at the physical redemption location, the given user device being associated with a given user;

operating a messenger bot to collect information and communicate the digital coupon through the messenger bot for a given food or beverage product to the given user device based upon the collected information and the detection of presence of the given user device at the physical redemption location, the collected information comprising a user geographic location of the given user device, the digital coupon having a redemption value and being redeemable toward a purchase of the given food or beverage product, and the messenger bot being implemented in a form of a two-way dialog between the messenger bot and the given user;

cooperating with a point-of-sale (POS) terminal at the physical redemption location serving the given food or beverage product to determine closing of an open guest check associated with a food and beverage tab for the given user based upon the given user device identifier;

cooperating with the POS terminal to obtain, from the physical redemption location, an amount due associated with the closed guest check;

validating redemption of the digital coupon at the physical redemption location based upon the given user device identifier and confirmation of the detected presence of the given user device at the physical redemption location based upon the collected user geographic location of the given user device via the messenger bot, cooperating with the POS terminal to apply the redeemable value of the digital coupon based upon the validation to obtain an amount due; and communicating to the physical redemption location authorization for payment of the amount due as a cardless transaction based upon the confirmation of the detection of presence of the given user device at the physical redemption location and based upon the collected information.

13. The non-transitory computer readable medium of claim 12 wherein the authorization for payment of the amount due comprises an authorization for payment of the amount due from the given user device.

14. The non-transitory computer readable medium of claim 12 wherein at least one of the user devices has a payment account associated therewith; and wherein the operations comprise communicating the authorization for payment of the amount due based upon the payment account.

* * * * *